Patented Oct. 29, 1929

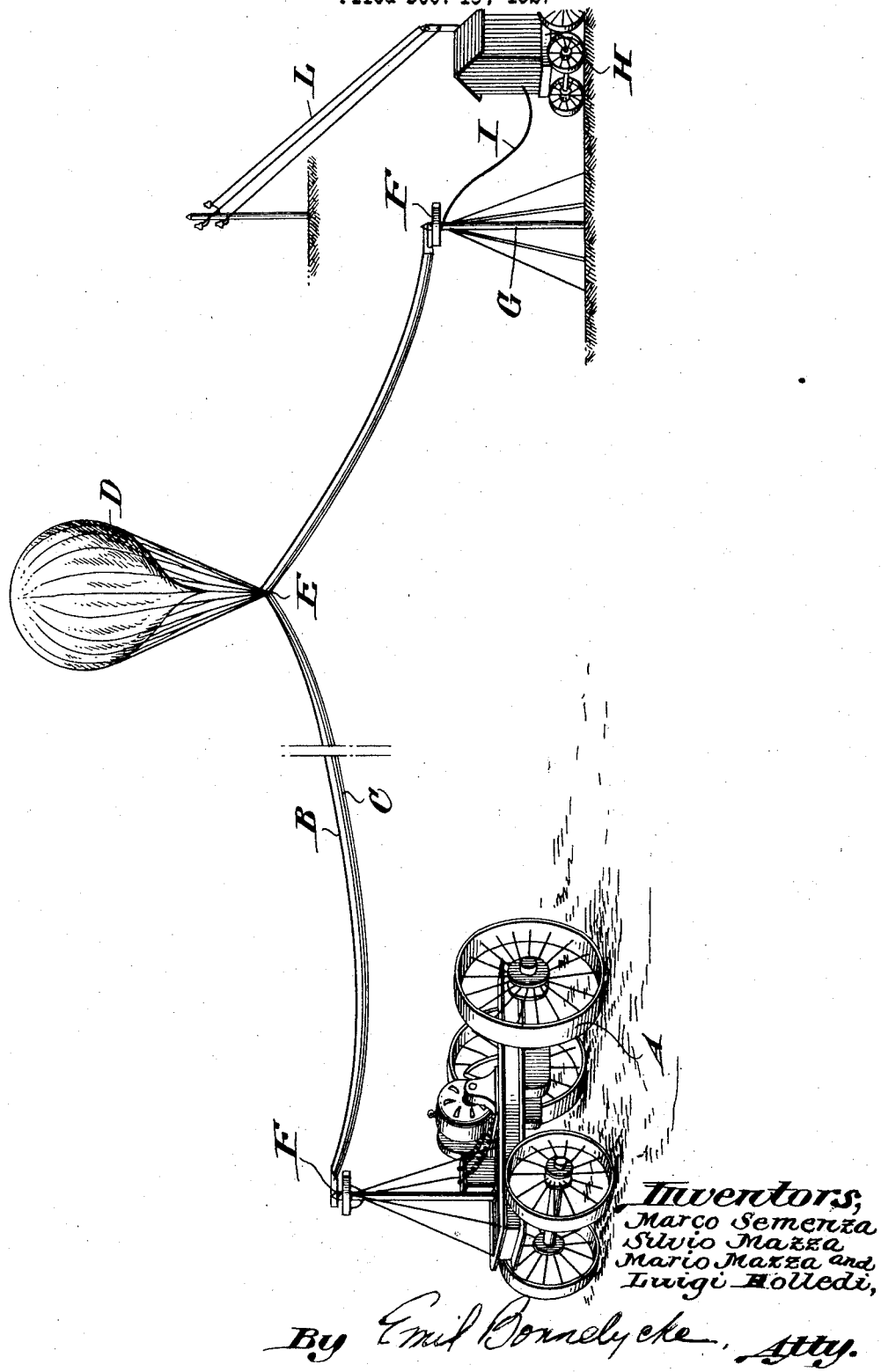

1,733,242

UNITED STATES PATENT OFFICE

MARCO SEMENZA, OF MILAN, AND SILVIO MAZZA, MARIO MAZZA, AND LUIGI BOLLEDI, OF CARPANETO, ITALY

SYSTEM OF ELECTRIC PLOWING BY DIRECT TRACTION

Application filed December 19, 1927, Serial No. 241,243, and in Great Britain, France, and Germany February 14, 1927.

The various systems of electric plowing which have been devised up to now may be divided in two classes: first, funicular systems which transmit motion to the plow or plows by means of steel ropes moved by winding drums or the like, such drums being actuated by electric motors and remaining on the borders of the ground to be plowed, and second, direct traction systems in which the plow or plows are directly pulled by an electric tractor driven by a motor on board, which tractor runs to and fro on the ground acting like a common steam or petrol tractor.

In both cases the electric energy must be transported to the motors by means of a cable or a system of overhead contact lines. If the cable is used, it must wind and unwind on a revolving drum in order to follow the movements of the motor, lying on the ground between the drum and the motor. If the motor is placed on a tractor the cable will drag on the ground and be subjected to intense friction and wear.

The cable must then be renewed very often and the danger of short circuits is great on a cable subjected to such treatment.

In the case of the overhead contact line, this must be movable without great difficulty so as to be able to follow the movements of the plow. The displacement of such a line is always an annoying and complicated matter, consuming much time and necessitating the employment of able workmen, and also in this case the handling of the line must be done very carefully to avoid dangers due to the current in the line.

For all those reasons no practical development has been obtained, so far as I am aware, of the direct traction system; the cost and the risk being excessive for practical agriculture.

To eliminate the defects of all those systems while conserving the independence of movement of the tractor which is the most important characteristic of the direct traction system, a new system has been devised, which constitutes the subject of the present invention.

The fundamental principle of the new system consists in the fact that the cables for transmitting the electric current to the motor which is mounted on the tractor, instead of being rolled and unrolled on a drum and dragging on the ground, are kept suspended in the air by a balloon filled with hydrogen or other gas lighter than air.

In these conditions, referring to the drawing annexed, and supposing, as usual, that the current is supplied through a tri-phase high tension line L in the vicinity of the fields to be plowed, the first operation is to transform the current to have a lower tension at the motor, or to convert it if direct current is used. This operation is done generally in a portable substation H. Then the traveling cables C conducting the current so transformed or converted to the motor on the tractor A may start direct from the substation, if this is placed in a convenient location, or (as most commonly will be the case, and as is shown on the drawing) the current may be transmitted by means of other cables I (or of a portable overhead line) drawn through the grounds, to a mast G, to which the traveling cables C are connected. The cables or lines I between the substation and the mast are connected up at the beginning of the operation and remain fixed, without dragging on the ground or being anywhere displaced till the plow, not shown in the drawing, drawn by the tractor A, has plowed all the ground which is in the radius of action of the cables C.

The latter are connected at the top of the mast G to a revolving brush contact F which allows the cables to turn around the mast without intercrossing.

The same type of contact F is used at the other extremity of the cables, being placed on top of a small mast mounted on the tractor. At a point E about midway of the traveling cables C the balloon D is applied which, having a lifting force sufficiently greater than the weight of the cables, keeps the latter always in the air. The balloon is also anchored by a safety steel cable B, not traversed by the current. The height of the balloon D is naturally automatically variable following the movements of the tractor A. It is maximum when the tractor A is in the immediate neighbourhood of the fixed mast G and is minimum when the tractor is as far from the mast as the length of the cables will allow. In all intermediate positions the balloon D will assume intermediate heights, rising or falling automatically and always being located at the middle of the cables.

The tractor A is thus completely free to move in any direction, and also to turn around itself if necessary, provided that it remains in a circular area having for radius the length of the traveling cables and for center the fixed mast G. To any position of this latter corresponds, then, a ground surface free to be plowed having a circular shape and limited only by the length of the cables C.

This length naturally may be varied either by winding up the cables, and so shortening them, or by adopting different dimensions for the balloon D, so that practically every requirement may be fulfilled. In fact also the power of the motor on the tractor A may be chosen as great as is necessary for any case (for instance for pulling one or more plows with the required depth of furrow). Only the section of the cables C and consequently their weight and the dimensions of the balloon must be determined so to correspond to the power requirements of the motor.

Naturally all known systems to render as light as possible the cables C must be used, the cost of the installation depending mainly on the dimensions of the balloon. Thus, for instance, aluminum cables, and three single-core cables instead of a three-core cable, may be used and all other arrangements that science may suggest, to lighten the total weight.

Another factor or element which can be varied between certain limits and which may be useful for reducing the section of the cables and consequently the dimensions of the balloon, is the voltage of the motor line.

As stated above, the balloon must have an extra lifting force so as to be able to resist, without undue lateral displacement, the action of the wind. The balloon may be also furnished with an automatic discharge valve of known construction which will open in case the cables are torn so that the balloon would escape if not immediately emptied.

The drawing representing the plant is naturally diagrammatic, and the electric tractor may be of any type without interfering with the new system.

Naturally the same system may be used for any agricultural or industrial operation other than plowing which might be facilitated by it.

What we claim is:

1. In combination, an automotive vehicle provided with an electric motor for driving it; a mast on said vehicle provided at its top with a connecting device comprising a fixed and a rotatable contact member, the former being electrically connected to said motor; a stationary mast provided at its top with a similar connecting device; a source of current supply; conducting means between said source and the fixed contact member of the connecting device on the stationary mast; a flexible conductor cable connected at opposite ends to the rotatable contact members of the two connecting devices; and a captive balloon located above and connected to said cable for constantly holding it elevated.

2. In combination, an automotive vehicle provided with an electric motor for driving it; a mast on said vehicle provided at its top wth a connecting device comprising a fixed and a rotatable contact member, the former being electrically connected to said motor; a stationary mast provided at its top with a similar connecting device; a source of current supply; conducting means between said source and the fixed contact member of the connecting device on the stationary mast; a flexible conductor cable connected at opposite ends to the rotatable contact members of the two connecting devices; an anchor cable paralleling the conductor cable and likewise connected at opposite ends to the two rotatable contact members; and a captive balloon located above and connected to both cables for constantly holding them elevated.

In testimony whereof we affix our signatures.

MARCO SEMENZA.
SILVIO MAZZA.
MARIO MAZZA.
LUIGI BOLLEDI.